May 12, 1953  S. M. NAMPA  2,638,318
LOADING APPARATUS
Filed Nov. 29, 1945  2 Sheets-Sheet 2

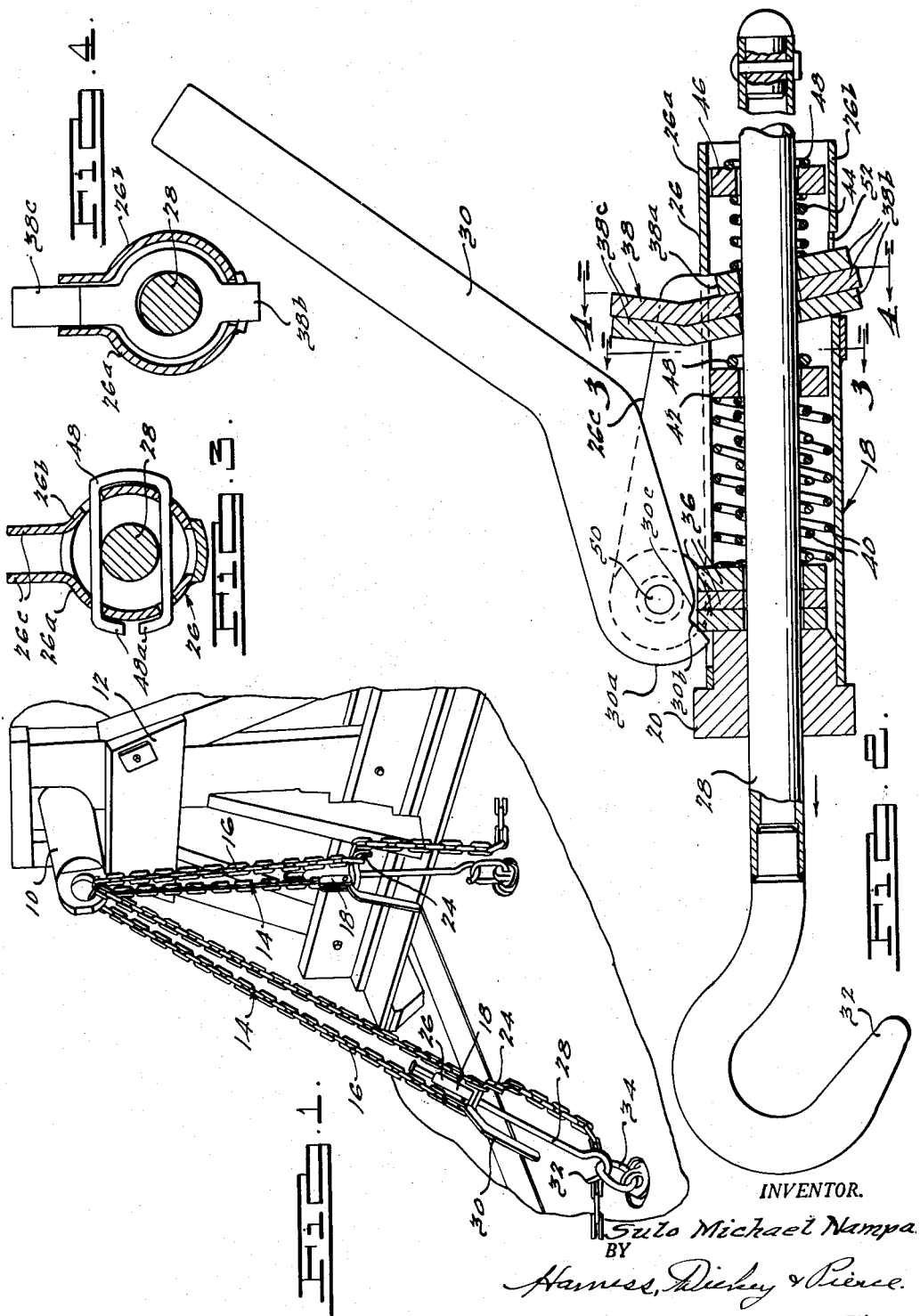

INVENTOR.
Sulo Michael Nampa.
BY
Harness, Dickey & Pierce.
ATTORNEYS.

Patented May 12, 1953

2,638,318

UNITED STATES PATENT OFFICE 2,638,318

LOADING APPARATUS

Sulo Michael Nampa, Detroit, Mich., assignor to Evans Products Company, Detroit, Mich., a corporation of Delaware Application November 29, 1945, Serial No. 631,674

8 Claims. (Cl. 254—106)

The present invention relates to freight loading apparatus, and is particularly directed to hold down or tie down apparatus for securing freight in vehicles such as aircraft.

Principal objects of the invention are to provide apparatus of the above generally indicated character, which is simple in arrangement, economical of manufacture and assembly, easy to use and maintain, and reliable and efficient in operation; to provide such apparatus comprising generically a hold down means, such as a chain, and a combined take-up and locking tool for tensioning the chain or the like; to provide such apparatus embodying an improved construction of take-up and locking device; and to provide an improved force applying device of the so-called friction plate type.

With the above as well as other and in certain cases more detailed objects in view, which appear in the following description and in the appended claims, a preferred but illustrative embodiment of the invention is shown in the accompanying drawings, throughout the several views of which corresponding reference characters are used to designate corresponding parts and in which:

Figure 1 is a perspective view of a freight loading assembly embodying the invention;

Figure 2 is a detailed view, in longitudinal central section, of the improved take-up and locking device;

Figure 3:
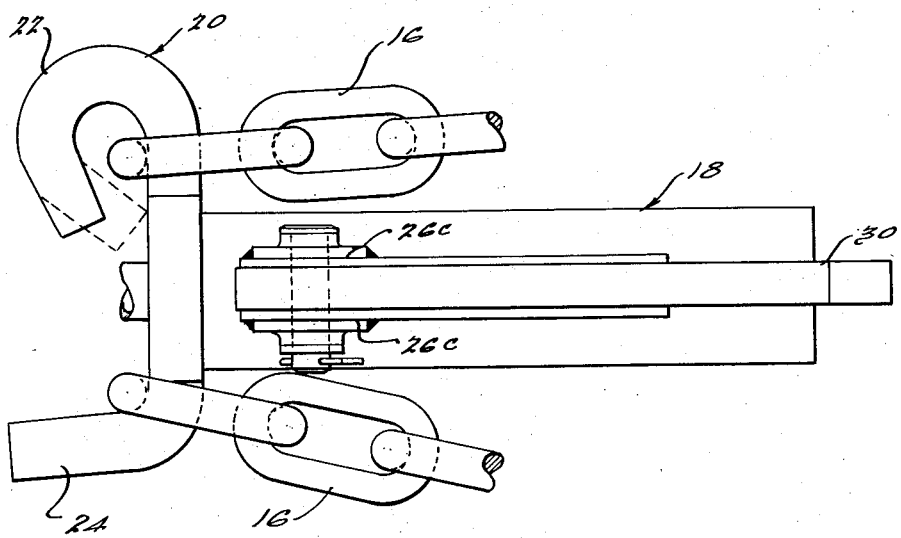
Figure 5:
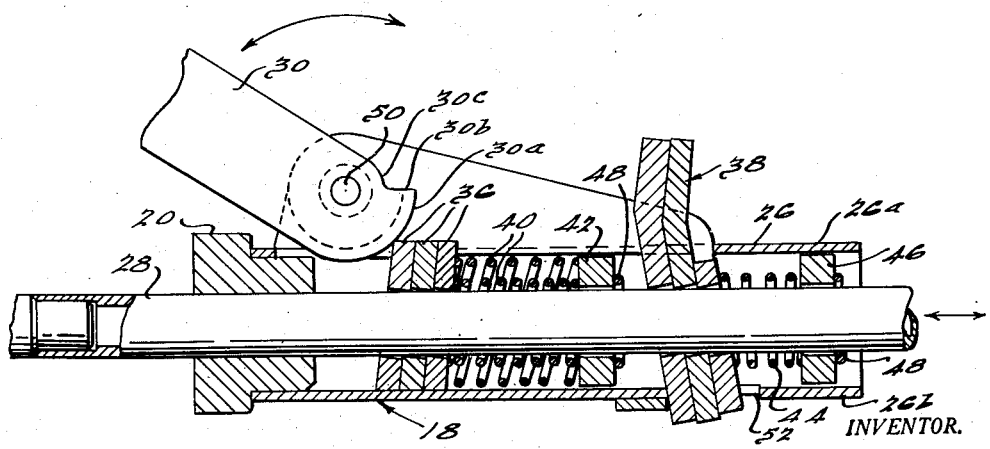

Figures 3 and 4 are views in horizontal section, taken respectively along the lines 3—3 and 4—4 of Figure 2;

Figure 5 is a view in side elevation of the work engaging head of the force applying device; and, Figure 6 is a fragmentary view in section, corresponding generally to Figure 2, but showing the force applying device in its released position.

It will be appreciated from a complete understanding of the invention that, in a generic sense, the improvements thereof may be embodied in devices intended for a wide variety of different uses and that such devices may partake of various different forms. In the preferred practice of the invention the improvements thereof are utilized in connection with aircraft loading systems. Such systems, as will be understood, are subjected to severe and unusual types of shock loads, while in flight, and require a high degree of reliability and efficiency. In an illustrative but not in a limiting sense, the improvements of the invention are disclosed herein in connection with such a system.

In Figure 1, an illustrative freight article 10, which is carried by a shipping frame 12, is held in place by means of hold down apparatus which includes the two identical assemblies 14. Each such assembly comprises a looped chain 16, and a combined take-up and locking device 18. As most clearly appears in Figure 5, the ends of each chain 16 are hooked over a fitting 20 which is rigidly secured to and forms a part of the body of the associated take-up device 18. Each head 20 is provided with an eyelet 22 which may be partially or entirely closed, so as to retain one end of the chain and is also provided with a hook-like extension 24 over which the other end of the chain may be hooked, after having been passed through or over, or otherwise engaged with, the freight article 10.

Each take-up device 18 comprises fundamentally a pair of relatively movable housing and post members 26 and 28, which may be moved relative to each other by reciprocating the operator 30 which, in this instance, comprises a usual swingable handle. The housing or body 26 carries the previously identified head 20, and the outer end of the column 28 is provided with a hook 32 which, as shown, is looped through a usual floor ring 34.

The housing or body 26 is composed of a pair of similar complementally shaped stampings 26a and 26b, which may be welded or otherwise secured together. The previously identified head 20 is rigidly secured to the body at one end thereof, as by welding and is centrally apertured to accommodate the movements of the post or column 28.

The illustrated device 18 is of the so-called friction plate type, and embodies two series of friction plates 36 and 38. All of the plates 36 are similar in form, and are apertured to accommodate the column 28. The plates 38 are of similar form, with the exception that the outer plate 38a does not embody a protruding ear 38b, and these plates are centrally apertured to accommodate the column 28. The plates 38 serve as holding plates, and the plates 36 serve as lifting plates. A pair of compression springs 40 are interposed between the plates 36 and a stop 42, and continuously urge the plates 36 into a position in which they abut the inner face of the head 20. Springs 40 tend to maintain the plates 36 in a position such that the axes of the latter are parallel to the axis of the column 28, so that the plates and the column may slide freely relative to each other.

A centering spring 44 is interposed between a stop 46 and the plates 38, and continuously acts to urge the plates 38 to a position in which their axes are parallel to the axis of the column 28, whereby these plates and the column may slide freely relative to each other. The stops 42 and 44 are releasably supported, in holding relation to the springs 40 and 44, by wire clips 48, which are passed through apertures provided therefor in the housing 26. After insertion, the clip ends 48a are inwardly bent to hold the clips in place.

Intermediate their ends, the housing sections 26a and 26b are provided with radially projecting portions 26c, which define between them a slot to pivotally receive the operating handle 30. Handle 30 is pivotally mounted upon a pin 50 which is journaled in the portions 26c. Handle 30 which is of dog leg form, to better accommodate it to the hand of the operator, is provided with a cam shaped inner end, which defines the generally cylindrical portion 30a, a radial portion 30b, and a generally circular portion 30c, which cam portions cooperate with the plates 36 in the hereinafter described manner.

The take-up device 18 is shown in Figure 2, in its locked position, in which the tool is subjected to a tension force tending to move the column 28 to the left, relative to the housing. It will be noticed that the load which is applied to the head 20 is transmitted through the housing sections, to the tail pieces 38b of the plates 38, which project outwardly through a slot 52, provided therefor in the housing or body. This force cocks the plates 38 relative to the column 28, and causes the plates 38 to frictionally bind upon the column 28 and prevent slippage between the plates and the column. In the normal position of the parts, therefore, the device is locked, and securely maintains the associated chain under tension. To effect a take-up movement, to initially tension the associated chain 14, the handle 30 is reciprocated in the plane of the drawing, Figure 2. It will be noticed from Figure 1 that this reciprocation takes place in a plane which is parallel to and immediately adjacent the line of action of the assembly comprising the chain 14 and the tool 18. Thus, the device may be conveniently utilized in limited slot-like spaces afforded between adjacent freight articles. Each counterclockwise movement of the handle 30 causes the handle surface 30b to bear against the plates 36, and slightly cock them relative to the column, establishing a holding connection therewith. Continued such handle movement moves the housing 26 to the left relative to the column 28. The initial such movement of the housing releases the plates 38 from a holding relation to the column, enabling the associated spring 44 to straighten them, and enabling these plates to move along the column 28 with the housing. As soon as the handle movement is reversed, the housing 26 again bears on the tails 38b of the plates 38, re-cocking them, and re-establishing their holding effect. Continued such reciprocating movements of the handle 30 thus advance the housing 26 relative to the column 28 in step-by-step fashion.

To release the holding device, handle 30 may be swung clockwise from the position shown in Figure 2, to a position in which the back thereof bears against the noses 38c of the plates 38. A relatively light such pressure partially uncocks the plates 38 and gradually releases the holding effect thereof, enabling a gradual retrograde movement between the housing 26 and the column 28. A continued such handle movement entirely releases the holding effect of the plates 38, thereby completely releasing the holding effect thereof on the column 28.

Referring to Figure 6, the handle 30 may be turned to a normal or inactive position, also shown in Figure 1, in which it lies immediately adjacent the axes of the column and housing, and so minimizes the transverse space requirements of the unit. More particularly, in so turning the handle 30, the radial cam surface 30b forces the plates 36 along the column 28, compressing the springs 40, and bringing the cylindrical surface 30a into engagement with such plates. In this position, the force of the springs 40 acts to yieldably hold the handle 30 against movement. It will be noticed that the movement of handle 30 to the inactive position involves a final take-up movement of the holding device.

Although only a single specific embodiment of the invention has been described in detail, it will be appreciated that various further modifications in the form, number, and arrangement of the parts may be made without departing from the spirit and scope of the invention.

What is claimed is:

1. In a force applying device, the combination of a housing providing means for engaging a load, a column extending through the housing and providing a reaction means, a lifting plate and a holding plate each tiltably mounted on the column and axially spaced from each other, a shoulder on the housing offset from the column and engaging the holding plate to provide means for tilting the plate into engagement with the column, spring means confined between the housing and holding plate, a handle pivoted on the housing on an axis transverse to the axis of the column, said handle having a shoulder offset from the column and operatively engageable with the lifting plate to tilt it on said column and clamp it thereto, spring means confined between the housing and lifting plate, said handle having a second shoulder operatively engageable with the holding plate to disengage it from the column, said handle shoulders being constructed and arranged so that only one at a time is operatively engaged with said plates.

2. The invention set forth in claim 1 wherein said handle is pivoted on the outside of said housing and said holding plate has a portion located on the side of the column opposite said housing shoulder which projects out of the housing and into the path of the second handle shoulder as the handle is moved in a direction opposite to the direction that it is moved to effect application of force.

3. In a force applying device, the combination of a reaction member, a load engaging member, means for moving the load engaging member relative to the reaction member comprising a body and a pair of friction clamps, one of the clamps being an actuating clamp and the other one of the clamps being a holding clamp, an operating lever pivotally mounted on the body and having means thereon operative upon movement of the lever in one direction for actuating the actuating clamp, said lever also having means thereon operative upon movement of the lever in the other direction for disabling the holding clamp.

4. In a force applying device, the combination of a reaction member, a load engaging member, means for moving the load engaging member relative to the reaction member comprising a body provided with one of said members and a lifting element and a holding element, an operating lever pivotally mounted on the body and having means thereon operative upon movement of the lever in one direction for actuating the lifting element, said lever also having means thereon operative upon movement of the lever in the other direction for disabling the holding element.

5. In a force applying device, the combination of a housing providing means for engaging a load, a column extending through the housing and providing a reaction means, a lifting plate and a holding plate each tiltably mounted on the column and axially spaced from each other, a shoulder on the housing offset from the column and engaging the holding plate to provide means for tilting the plate into engagement with the column, spring means confined between the housing and holding plate, a handle pivoted on the housing on an axis transverse to the axis of the column, said handle having a shoulder offset from the column and operatively engageable with the lifting plate to tilt it on said column and clamp it thereto, spring means confined between the housing and lifting plate, said handle shoulder being engageable with the lifting plate during only a limited portion of the total pivotal movement of the handle, said limited portion being exclusive of the pivotal movement of the handle adjacent to the column, and a surface on the handle engageable with the lifting plate as said shoulder passes out of engagement with the lifting plate during pivotal movement of the handle to a position adjacent the column, said spring means pressing the lifting plate against said surface, said surface being substantially formed on an arc coaxial with the pivot axis of the handle.

6. The invention set forth in claim 5 wherein said handle has a second shoulder operatively engageable with the holding plate to square it on the column during pivotal movement of the handle to a position remote from its position adjacent the column.

7. In a force applying device, the combination of a housing, a column extending through the housing, means for moving the housing relative to the column including a lifting element, a handle pivoted on the housing on an axis transverse to the column, spring means pressing the lifting element in one direction, said handle having a first surface and a second surface, both said surfaces being engageable with the lifting element against the pressure of said spring means, said first surface being operative to actuate the lifting element and being engageable therewith only when the included angle between the handle and column exceeds a predetermined angle, said second surface being engageable with the lifting element when said included angle is less than said predetermined angle, said second surface comprising substantially an arc having said pivot axis as a center.

8. The invention set forth in claim 7 wherein said means for moving the housing relative to the column includes a holding element, said handle having a third surface engageable with the holding element to disable the same when said included angle substantially exceeds said predetermined angle.

SULO MICHAEL NAMPA.

References Cited in the file of this patent

UNITED STATES PATENTS

| Number | Name | Date |
| --- | --- | --- |
| 712,083 | Morrill | Oct. 28, 1902 |
| 2,174,489 | Groves | Sept. 26, 1939 |
| 2,217,403 | Gunn | Oct. 8, 1940 |
| 2,222,910 | Luckner | Nov. 26, 1940 |
| 2,227,397 | Luckner | Dec. 31, 1940 |
| 2,242,431 | Luckner | May 20, 1941 |
| 2,323,144 | Long | June 29, 1943 |